UNITED STATES PATENT OFFICE.

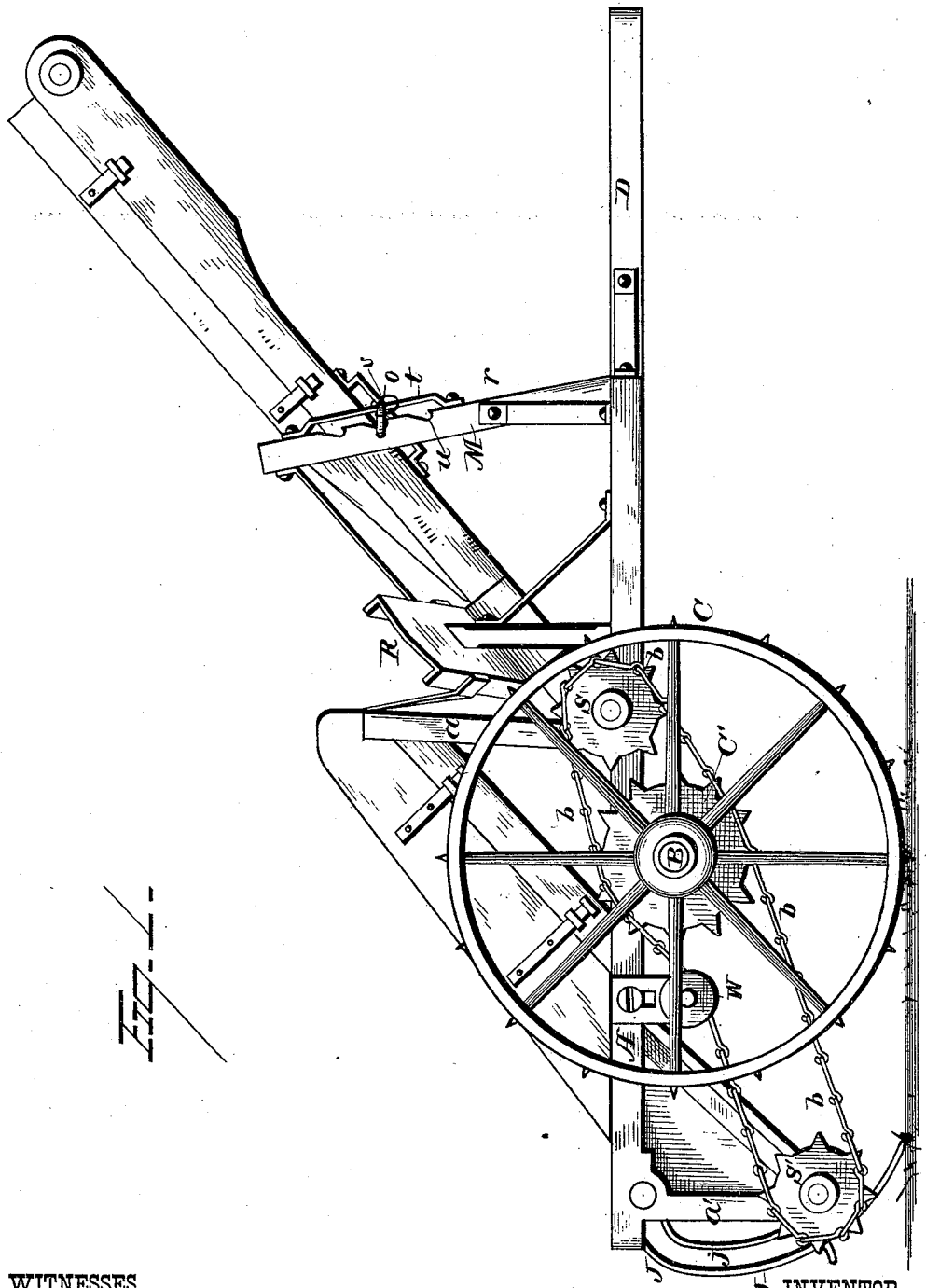

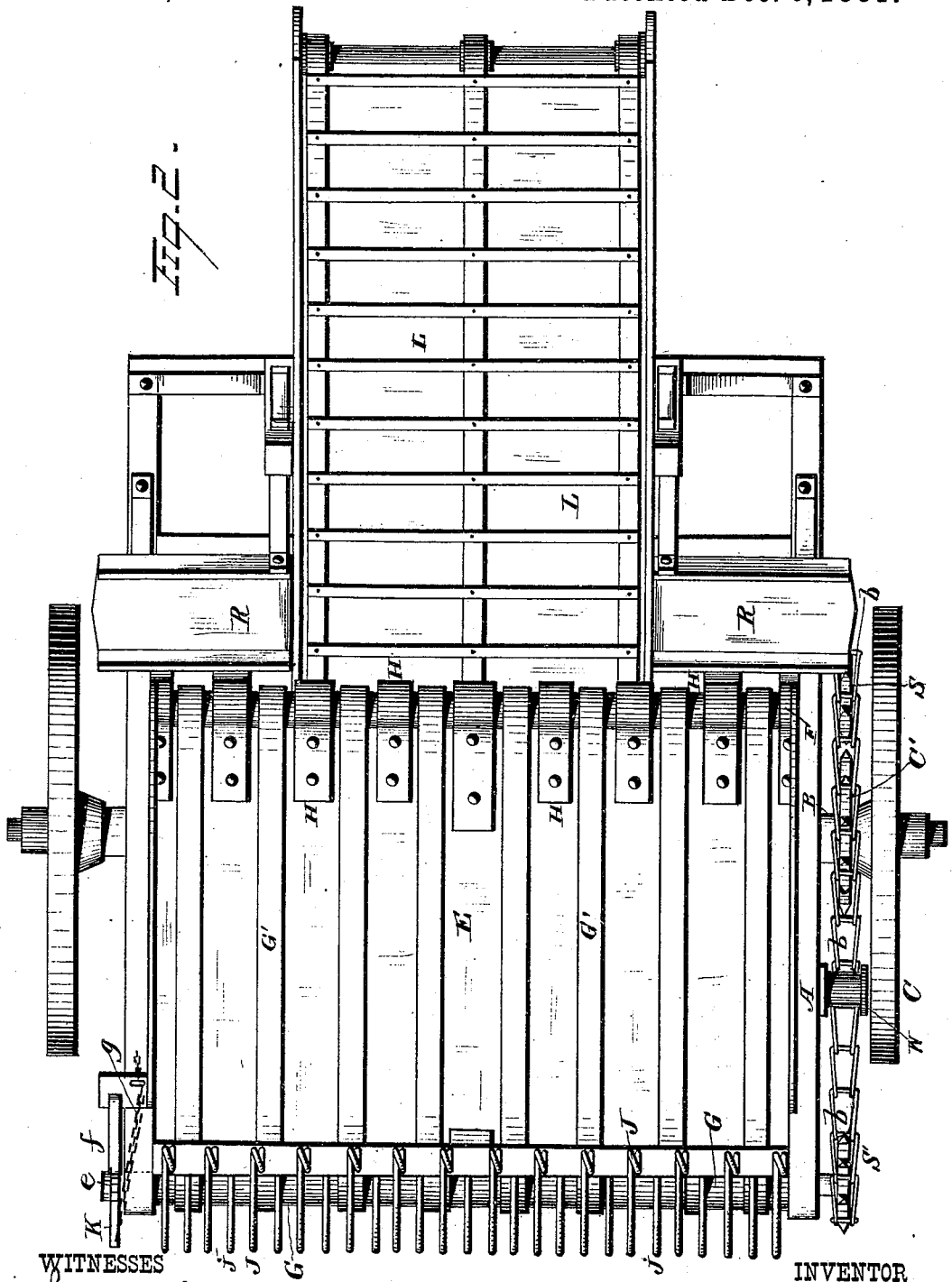

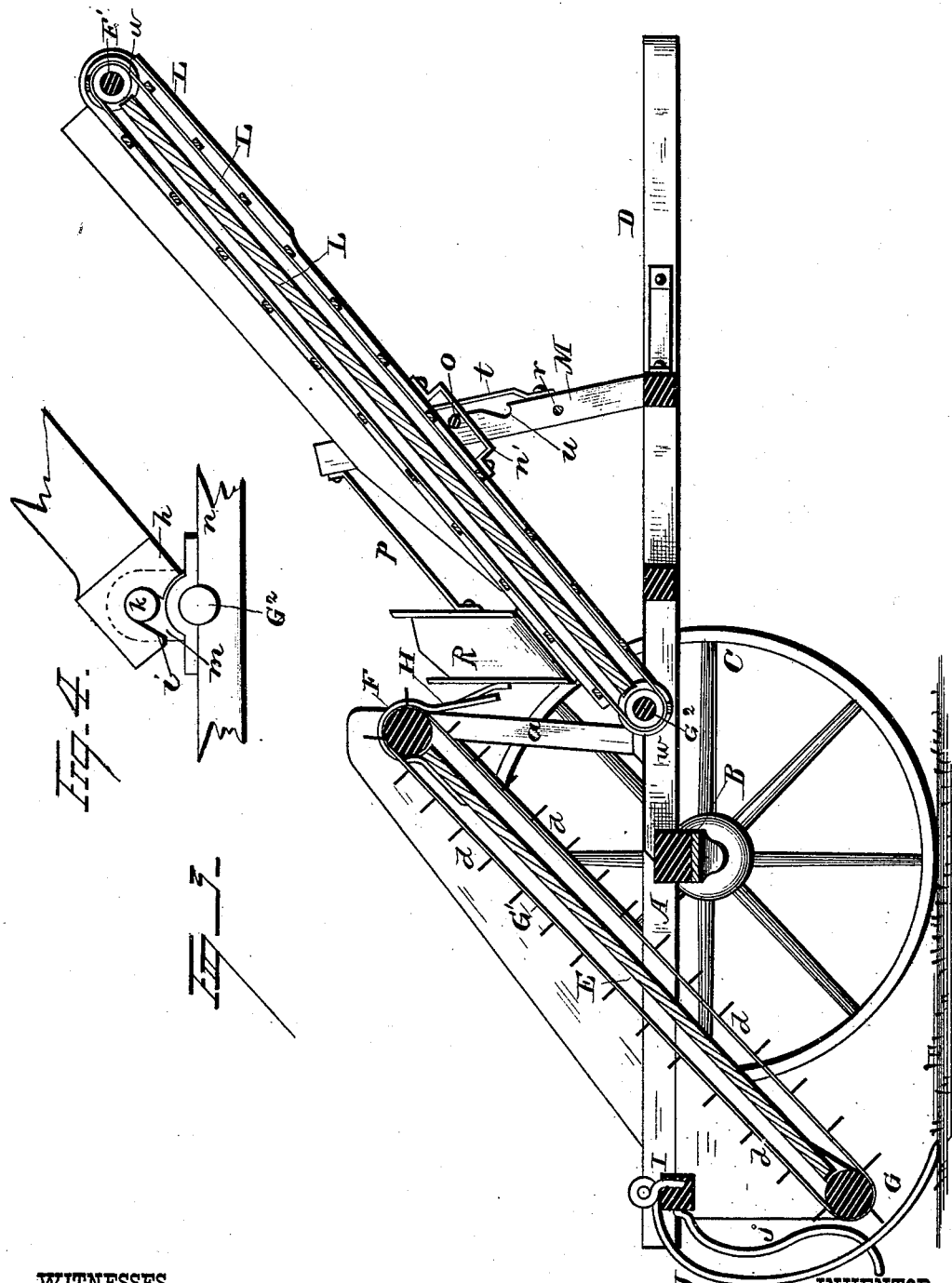

FRANKLIN F. ROYER, OF HAMPTON, IOWA.

COMBINED HAY RAKE AND ELEVATOR.

SPECIFICATION forming part of Letters Patent No. 250,394, dated December 6, 1881.

Application filed April 16, 1881. (Model.)

*To all whom it may concern:*

Be it known that I, FRANKLIN F. ROYER, of Hampton, in the county of Franklin and State of Iowa, have invented certain new and useful Improvements in Combined Hay Rake and Elevator; and I do hereby declare the following to be a full, clear, and exact description of the invention, such as will enable others skilled in the art to which it pertains to make and use it, reference being had to the accompanying drawings, which form part of this specification.

My invention relates to an improvement in a combined hay rake and elevator.

In the accompanying drawings, Figure 1 is a side view of my improved machine. Fig. 2 is a plan view of the same, and Fig. 3 is a longitudinal section. Fig. 4 is a detached view of the pivotal attachment of one of the elevator-frames.

A represents a strong frame, supported near its center upon a transverse axle, B, mounted on wheels C, and attached to and held in position by the pole D to the rear end of the wagon on which the hay is to be loaded. The axle B is provided with a drive-wheel, C', for driving the elevator-belts, as will be more fully explained hereinafter.

The rear elevator, E, of the same width as the rake, is attached to the frame in an inclined direction, and is supported at its front and rear ends by suitable braces, a a', extending respectively up and down from the frame, and adapted to hold the elevator securely thereon.

F and G are shafts having drums or rollers secured thereon, said shafts being situated respectively at the upper and lower ends of elevator E and secured to braces a a'. The shaft G has a sprocket-wheel secured at one end thereof, which engages the drive-chains b of the elevator and drives the endless belts G', having teeth d secured on their upper surface, which convey the hay to the second elevator, L.

H are the strippers, secured at the upper end of elevator E, and are adapted to strip or release the straw from engagement with the teeth of the elevator-belts as the same wind around the drum F to the bottom of the elevator. These strippers H are bent to form springs, which allow the teeth to pass should they by any accident become clogged with hay during the operation, thereby preventing the belts from becoming inoperative, which would be the case were the strippers made rigid and not allowed to spring back for the passage of the belts.

I is a transverse bar, journaled at the rear end of the elevator-frame near the junction of the brace a' and frame A, having the spring rake-teeth J secured on the top thereof, said teeth curving backward and downward and adapted to gather and carry the hay until the same has been picked up by the teeth on the endless conveyer. To prevent the accumulation and consequent clogging of the hay in the rake-teeth and elevator, I provide a row of spring guard-teeth, j, running from the back of the bar I between the rake-teeth, said guard projecting in front of the rake teeth, and the ends of said guard-teeth passing backward and out between the spring rake-teeth. These guard-teeth throw the hay as fast as it accumulates in the rake-teeth proper onto the carrier or elevator E.

A hand-lever, K, is secured at one end of the rake-bar I, by which the rake-teeth are raised or lowered as desired. The base of the lever K is provided with ratchet-teeth e, with which a gravity-pawl, f, attached to the side of the rear elevator, E, engages and holds the teeth down to the ground when the machine is in operation. The rake is held up from engagement with the ground when passing along roads or through fields by the hook and chain g.

The front elevator, L, is of smaller width than the rear one, and is adjustably secured to the frame with its rear end below and under the front end of the rear elevator, E. The sides of this elevator are provided at their rear ends with metallic end pieces, h, having slots i formed therein, which fit over fingers or lugs k, formed on the holding-plate m, the said plate being secured to the brace n in any suitable manner. This elevator is adjustably secured, at or near the center thereof, by an elevating-bar, O, to the upright standards M, one on each side thereof, the said standards being fastened and held in position on the frame by the braces p. The uprights are also secured together by the tie-rod r. The elevator-bar O is situated at the bottom of the elevator L, and has sliding movement in the guards. The ends of this bar project beyond the sides of the elevator, and have movement in guideways $t$ on the sides of standards M. Notches $u$ are formed in the standards, in which the projecting ends of the bar rest and hold the elevator L in any desired position to suit the wagon into which the hay is being deposited. Cords or ropes $v$ are attached to the projecting ends of bar, and serve to draw the bar from the notches, which allows the elevator to be elevated or lowered by hand. This cord runs to and is attached to the side of the frame of elevator L, where it can be easily reached from the wagon. The conveyers or belts of this elevator are wound around the drums $w$ on shafts $F'$ $G^2$, the shaft $F'$ being secured directly to the side pieces of the elevator L at its upper end, and the shaft $G^2$ being secured to the strong frame A at the lower end of the elevator. Chutes or side pieces, R, are situated at the rear of the stationary elevator E and to the sides of the adjustable elevator L, and are so inclined to receive the hay that would otherwise fall to the ground and direct the same onto the adjustable elevator to be carried to the wagon.

The carriers are operated by the drive-chain $b$, which passes over and around the sprocket-wheels S S' on the ends of shafts and engages with the teeth on the upper and under surface of drive-wheel C', rigidly secured to the axle B.

To the side of the frame, and immediately over the drive-chain, is movably secured a tightener, W, adapted to slide up and down and tighten the chain as circumstances demand. The part of this tightener which bears directly on the drive chain is made to revolve so as not to produce any friction and prevent the operation of the carriers by clogging the chain. Any number of carriers or belts may be used in connection with my machine, and they may either be provided with teeth directly attached thereto or to transverse strips secured on the belts.

The under surface of elevator L is provided with a shield, L', which prevents the hay from passing under the elevator with the conveyer-belts, and also serves to protect the heads of persons from injury while working under the same.

Having fully described my invention, what I claim as new, and desire to secure by Letters Patent, is—

1. The combination, with the front elevator and standards secured to the carrying-frame, said standards provided with a series of notches and a guard covering the same, of a rod supported in loops attached to the under side of the elevator and adapted to be inserted in the slots or notches in said standards, substantially as set forth.

2. The combination, with a double-toothed hay-rake, main elevator, and vertically-adjustable narrow elevator, of yielding strippers attached to the upper end of the main elevator-frame, and the inclined chutes R R, each provided with stationary sides and bottom, and supported on standards attached to the supporting-frame, substantially as set forth.

In testimony that I claim the foregoing I have hereunto set my hand this 10th day of April, 1881.

FRANKLIN FAYETTE ROYER.

Witnesses:
 DAVID CHURCH,
 MATTHIAS G. ROYER.